3,584,053
PREPARATION OF o-HYDROXY-p-ALKOXY-
BENZOPHENONES
Edyta Zofia Boboli, Ul, Krasinskiego 34a m9; Wladyslaw
Longin Malasnicki, Ul. gen. Zajacrka 19m 44; and
Mieczyslaw Kowalski, Ul. Wyspianskiego 2m 3, all
of Warsaw, Poland
No Drawing. Filed Oct. 4, 1967, Ser. No. 672,708
Claims priority, application Poland, Oct. 8, 1966,
P 116,793
Int. Cl. C07c 49/82
U.S. Cl. 260—591                                  3 Claims

ABSTRACT OF THE DISCLOSURE

Orthohydroxy-para-alkoxybenzophenones of the general formula

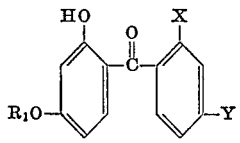

wherein X is H or OH, $R_1$ is an alkyl radical having from 1 to 18 carbon atoms and Y is H or an alkoxy group in which the alkyl component has from 1 to 18 carbon atoms, are prepared by the O-alkylation of di-, tri-, or tetrahydroxybenzophenone with a $C_1$–$C_{18}$ alkyl ester of benzene sulphonic acid or of paratoluene sulphonic acid, the reaction being preferably carried out in the presence of an alkanone or cycloalkanone, such as acetone, methyl-ethyl ketone or cyclohexanone, and in the presence of an alkali metal carbonate such as potassium or sodium carbonate, for 5 to 10 hours at a temperature of about 50° C.

The invention relates to a process for the preparation of o-hydroxy-p-alkoxybenzophenones of the general formula

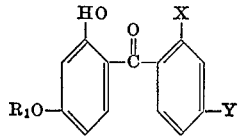

wherein X is a hydrogen atom or a hydroxyl group, $R_1$ is an alkyl group of $C_1$–$C_{18}$, and Y is a hydrogen atom or an alkoxy group of an alkyl radical identical as in $R_1$.

These compounds can be obtained according to two known methods. The first one, comprising a partial dealkylation of the alkoxybenzophenones obtained in the Friedel-Crafts reaction by means of a method known in the art, is employed mainly in the synthesis of lower derivatives of o-hydroxy-p-alkoxybenzophenones and of those simple methoxy group derivatives in particular, and is considered inconvenient for the preparation of higher derivatives thereof consisting of more than 7 carbons in the alkyl chain because of its low yield and technical difficulties. The second one is a variant of the Williamson reaction and comprises the o-alkylation of previously obtained hydroxybenzophenones by means of such alkylation factors as alkyl sulfates, which are not suitable for the preparation of higher ($C_8$–$C_{18}$) o-hydroxy-p-alkoxybenzophenones, or alkyl iodides or bromides which industrial application is limited because of their high prices. Said reaction takes place in a medium of boiling acetone or methyl ethyl ketone in presence of alkali metal carbonates or, alternatively, in a medium of sodium hydroxide ethanol-aqueous solution.

In the process according to the invention, o-hydroxy-p-alkoxybenzophenones of high purity are obtained with a relatively high yield by means of a simple reaction of $C_1$–$C_{18}$ alkyl esters of toluene sulphonic acid or benzene sulphonic acid which are easily obtainable and exceptionally active alkylation agents with a hydroxybenzophenone. The alkylation with said esters occurs in a medium of alkanones or cycloalkanones such as acetone, methyl ethyl ketone, cyclohexanone and others in the presence of an alkali metal carbonate at a temperature above 50° C. and in the course of 5–10 hours. The esters to be applied in said process can be obtained in a known reaction between normal primary alcohols and p-toluenesulphonyl chloride or benzene sulphonyl chloride in presence of a 45 percent sodium hydroxide ethanol-aqueous solution.

The method of the invention is illustrated in the following examples.

EXAMPLE 1

21.4 g. (0.1 mol) of 2,4-dihydroxybenzophenone, 19.0 g. (0.11 mol) of methylbenzene sulphonate, 12.7 g., (0.12 mol) of anhydrous potassium carbonate were mixed in a sixfold quantity of cyclohexanone at a temperature of 95–100° C. over a course of 5 hours. The reaction mixture was cooled, filtered and the solvent was removed from the filtrate by distillation under reduced pressure. The residue was submitted to crystallization from a $C_1$–$C_4$ aliphatic alcohol to obtain white 2-hydroxy-4-methoxybenzophenone of M.P. of 62.4–63.0° C. and of a yield of approx. 90 percent.

EXAMPLE 2

21.4 g. (0.1 mol) of 2,4-dihydroxybenzophenone, 25.1 g. (0.11 mol) of n-butyl-p-toluenesulphonate, and 12.7 g. (0.12 mol) of sodium carbonate were heated over a course of 9 hours in a quadruple quantity of cyclohexanone at a temperature of 70–75° C. The reaction mixture was treated in the same manner as in Example 1 to obtain 2-hydroxy-4-n-butoxybenzophenone of a cream colour of M.P. of 47.2–48.4° C. and of a yield of approx. 70 percent.

EXAMPLE 3

159.2 g. (0.743 mol) of 2,4-dihydroxybenzophenone, 223.6 g. (0.827 mol) of n-octyl benzene sulfonate and 126.2 g. (0.9 mol) of potassium carbonate were heated in a quadruple quantity of cyclohexanone over a course of 6 hours at a temperature of 95–100° C. The reaction mixture was treated as in Example 1 to obtain 2-hydroxy-4-n-octoxybenzophenone of white-green hue, of M.P. of 47.5–49.0 C. and of a yield of approx. 85 percent.

EXAMPLE 4

21.4 g. (0.1 mol) of 2,4-dihydroxybenzophenone, 37.5 g. (0.11 mol) of n-dodecyl-p-toluene sulphonate, and 16.8 g. (0.12 mol) of potassium carbonate were heated in a sixfold of methyl ethyl ketone over a course of 8 hours at a temperature 70–75° C. The reaction mixture was treated in the same manner as in Example 1 to obtain 2-hydroxy-4-n-dodecyloxybenzophenone of green-yellow hue, of M.P. of 40.2–41.4° C. and of a yield of approx. 62 percent.

EXAMPLE 5

21.4 g. (0.1 mol) of 2,4-dihydroxybenzophenone, 39 g. (0.11 mol) of tetradecyl benzene sulfonate, 16.8 g. (0.12 mol) of potassium carbonate were heated in sevenfold of cyclohexanone over a course of 7 hours at a temperature of 95–100° C. The reaction mixture was treated in the same manner as in Example 1 to obtain white 2-hydroxy-4-n-tetradecyloxybenzophenone of M.P. of 43.6–45.0° C. and of a yield of approx. 67 percent.

EXAMPLE 6

21.4 g. (0.1 mol) of 2,4-dihydroxybenzophenone, 42 g. (0.11 mol) of n-hexadecylbenzene sulfonate and 16.8 g. (0.12 mol) of potassium carbonate were heated in sevenfold of cyclohexanone over a course of 8 hours at a temperature of 95–100° C. The reaction mixture was treated in the same manner as in Example 1 to obtain white 2-hydroxy-4-n-hexadecyloxybenzophenone of M.P. of 44–46° C. and of a yield of approx. 60 percent.

EXAMPLE 7

23 g. (0.1 mol) of 2,2′,4-trihydroxybenzophenone, 25.2 g. (0.11 mol) of n-butyl-p-toluene sulphonate, and 16.8 g. (0.12 mol) of potassium carbonate were heated under constant stirring in a quadruple quantity of cyclohexanone over a course of 6 hours at a temperature of 95–100° C. The reaction mixture was treated in the same manner as in Example 1 to obtain light-yellow 2,2′-dihydroxy-4-n-butoxybenzophenone of M.P. of 50–51.2° C. and of a yield of approx. 60 percent.

EXAMPLE 8

23 g. (0.1 mol) of 2,2′,4-trihydroxybenzophenone, 29.7 g. (0.11 mol) of n-octylbenzene sulphonate and 16.8 g. (0.12 mol) of potassium carbonate were heated under constant stirring in eightfold quantity of cyclohexanone over a course of 6 hours at a temperature of 95–100° C. The reaction mixture was treated in the same manner as in Example 1 to obtain light-yellow 2,2′-dihydroxy-4-n-octoxybenzophenone of M.P. of 90–90.6° C. and of a yield of approx. 65 percent.

EXAMPLE 9

23 g. (0.1 mol) of 2,2′,4-trihydroxybenzophenone, 35.9 g. (0.11 mol) of n-dodecylbenzene sulphonate and 16.8 g. (0.12 mol) of potassium carbonate were heated under constant stirring over a course of 7 hours at a temperature of 95–100° C. in eightfold of cyclohexanone. The reaction mixture was treated in the same manner as in Example 1 to obtain yellow 2,4-dihydroxy-4-n-dodecyloxybenzophenone of M.P. 75–77.2° C. and of a yield of approx. 65 percent.

EXAMPLE 10

23 g. (0.1 mol) of 2,2′,4-trihydroxybenzophenone, 49.4 g. (0.11 mol) n-octadecylbenzene sulphonate, and 16.8 g. (0.12 mol) of potassium carbonate were heated under constant stirring with an eightfold quantity of cyclohexanone over a course of 5 hours at a temperature of 95–100° C. The reaction mixture was treated in the same manner as in Example 1 to obtain light-yellow 2,2′-dihydroxy-4-octadecyloxybenzophenone of M.P. of 87.2–88° C. and of a yield of approx. 60 percent.

EXAMPLE 11

24.6 g. (0.1 mol) of 2,2′,4,4′ - tetrahydroxybenzophenone, 47.2 g. (0.22 mol) of n-butylbenzene sulphonate and 33.6 g. (0.24 mol) of potassium carbonate were heated under constant stirring in an eightfold quantity of cyclohexanone over a course of 7 hours at a temperature of 95–100° C. The reaction mixture was treated in the same manner as in Example 1 to obtain green-yellow 2,2′-dihydroxy-4,4′-dibutoxybenzophenone of M.P. of 56.4–57.6° C. and of a yield of approx. 75 percent.

EXAMPLE 12

24.6 g. (0.1 mol) of 2,2′,4,4′-tetrahydroxybenzophenone, 59.5 g. (0.22 mol) of n-octylbenzene sulphonate and 33.6 g. (0.24 mol) of potassium carbonate were heated under constant stirring in an eightfold quantity of cyclohexanone over a course of eight hours at the temperature of 95–100° C. The reaction mixture was treated in the same manner as in Example 1 to obtain light-yellow 2,2′-dihydroxy,4,4′-dioctoxybenzophenone of M.P. of 64–65.2° C. and of a yield of approx. 70 percent.

EXAMPLE 13

24.6 g. (0.1 mol) of 2,2′,4,4′-tetrahydroxybenzophenone, 71.6 g. (0.22 mol) of n-dodecylbenzene sulphonate, and 33.6 g. (0.24 mol) of potassium carbonate were heated under constant stirring in eightfold quantity of cyclohexanone over a course of 7 hours at a temperature of 95–100° C. The reaction mixture was treated in the same manner as in Example 1 to obtain yellow 2,2′-dihydroxy-4,4′-didodecyloxybenzophenone of M.P. of 63–65° C. and of a yield of approx. 65 percent.

What we claim is:

1. A process of preparing an orthohydroxy-paralkoxybenzophenone of the formula:

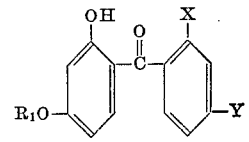

wherein X is a member of the group consisting of —H and —OH, $R_1$ is an alkyl radical having from 1 to 18 carbon atoms and Y is a member of the group consisting of —H and alkoxy, wherein the alkyl component has from 1 to 18 carbon atoms, which comprises: reacting a polyhydroxybenzophenone selected from the group consisting dihydroxybenzophenone, trihydroxybenzophenone and tetrahydroxybenzophenone, with at least an equimolecular proportion of a $C_1$ to $_{18}$ alkyl ester of a member of the group consisting of benzene sulphonic acid and paratoluene sulphonic acid, in the presence of an alkali metal carbonate, in an inert medium selected from the group consisting of acetone, cyclohexanone and methyl ethyl ketone, at a temperature of 50° C. to 100° C., to form a solution of the desired product in said medium and then separating said product from said medium.

2. The process of claim 1 in which the alkyl ester employed is a member of the group consisting of methyl benzene sulphonate, n-butyl-p-toluene sulphonate, n-octylbenzene sulphonate, n-dodecyl-p-toluene sulphonate, tetradecyl benzene sulphonate and n-hexadecylbenzene sulphonate.

3. The process of claim 1 wherein the polyhydroxy benzophenone employed is a member of the group consisting of
2,4-dihydroxybenzophenone,
2,2′,4-trihydroxybenzophenone and
2,2′,4,4′-tetrahydroxybenzophenone.

References Cited

UNITED STATES PATENTS 2,693,492  11/1954  Hoch _____ 260—591
2,962,533  11/1960  Hardy et al. _____ 260—591

OTHER REFERENCES

Ogata et al. Chem. Abstracts 45, 5122a (1951).
Oka, Chem. Abstracts 46, 8043f (1952).
Wagner and Zook, Synthetic Organic Chemistry, 1965. Call No. QD 262 W24 C.9.

DANIEL D. HORWITZ, Primary Examiner